UNITED STATES PATENT OFFICE.

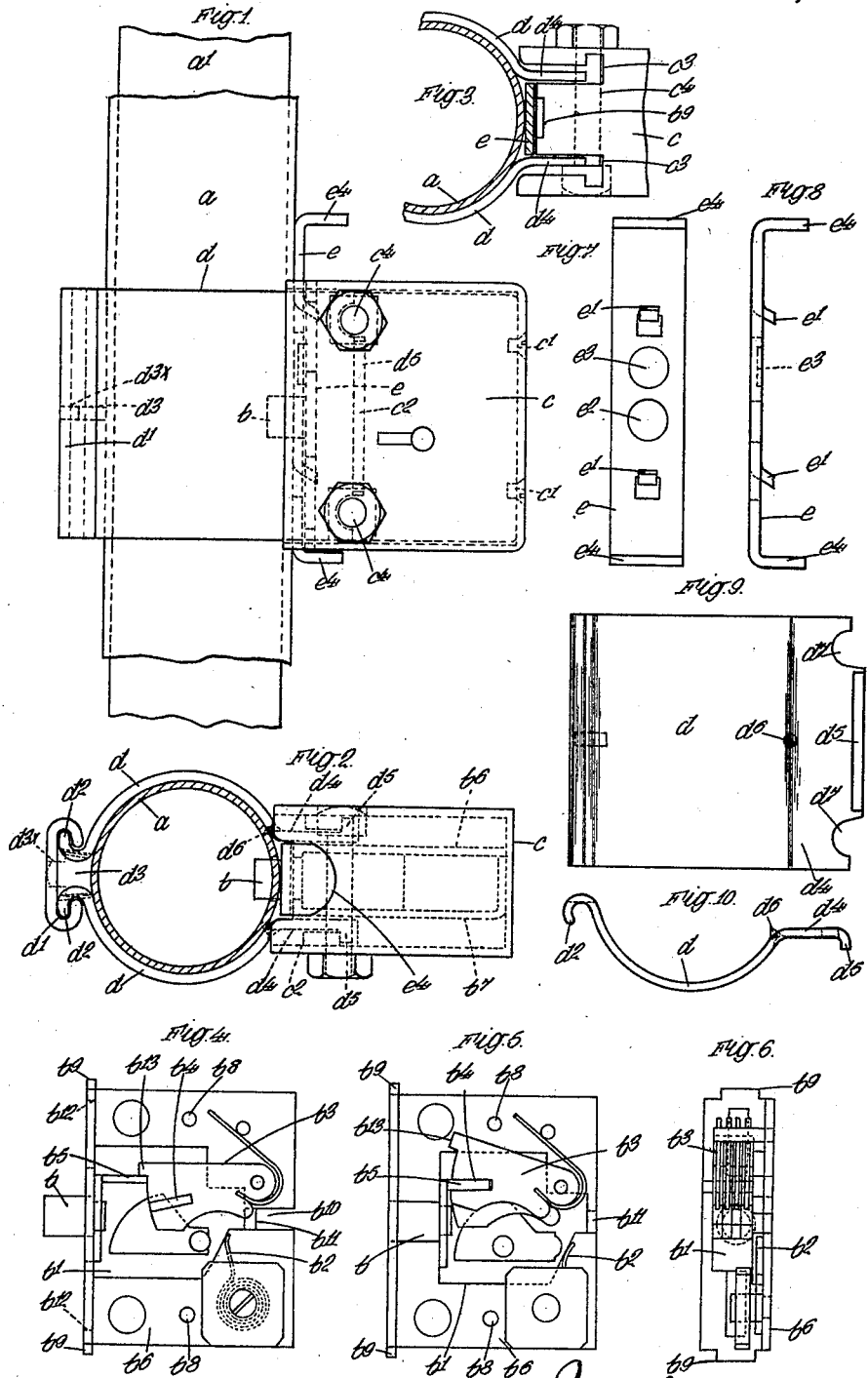

WILLIAM JOHN NIXON MANN, OF LONDON, ENGLAND.

LOCKING DEVICE FOR USE WITH ROAD-VEHICLES.

1,391,687.   Specification of Letters Patent.   Patented Sept. 27, 1921.

Application filed June 10, 1920. Serial No. 387,889.

*To all whom it may concern:*

Be it known that I, WILLIAM JOHN NIXON MANN, a subject of the King of Great Britain, residing at 2 Grand Parade Mansions, Muswell Hill, London, N., England, have invented certain new and useful Improvements in or Relating to Locking Devices for Use with Road-Vehicles, of which the following is a specification.

The present invention relates to locking devices suitable for use on motor cars, motor cycles, ordinary cycles, and other road vehicles, to guard against theft, of the kind in which the device comprises a locking member working through or in coincident holes in the steering column and the steering rod within it, the said locking member being operated into locking position by a spring and operable into the unlocking position by use of a key and restrained from moving into locking position by a member (hereinafter referred to as a control member) manipulable to release the locking member for the locking action. The main objects of the said invention are to prevent unauthorized or accidental operation of the control member to release the locking member, to render the control member more convenient to manipulate, and reliable; and to provide for ready attachment and detachment of the locking device to and from the steering column.

The said invention consists of improvements in locking devices of the kind referred to, and according to one improvement the control member is such that when in position to retain the locking member in unlocked position, it cannot be operated to render the locking member free to assume its locking position without the use of a key. For this purpose the control member may have a recess in which the locking member engages when retained by the control member in unlocking position whereby the latter member cannot be released for the purpose of allowing the locking member to assume locking position without withdrawing the locking member from the said recess by use of the key. Another improvement according to the said invention is to slidably locate the control member between the lock mechanism and the steering column and so to arrange the parts that the control member may be manipulated either to obstruct the locking member to retain it in unlocking position or allow the said member to pass by it into locking position. The control member is preferably operated upwardly and downwardly and is in its lower position when the locking member is being restrained. A construction of the control member according to the invention consists in arranging it to extend above and below the casing of the locking device and providing it with ears or other projections by which it may be manipulated and the control member is of bar or plate-like form. The invention further comprises an attachment device by means of which the locking device can be readily fixed in position on the steering column or removed therefrom, the said attachment device comprising two members, adapted to embrace the column and connected with each other in such manner that when free they may be turned outwardly to be passed over the column and provided with flanges with which the locking devices may be engaged by a sliding motion when the attachment means are disposed in position, to connect the locking device to the said means and at the same time hold the said members on the column. For the purpose of this connection the said flanges may have lips along their edges which engage behind projections in the casing of the locking device and the said casing may be secured in position by bolts or the like passed therethrough and acting on or engaging the said flanges.

In order that the said invention may be clearly understood and readily carried into effect I shall describe the same more fully with reference to the accompanying drawings which illustrate the preferred embodiment and in which:—

Figure 1 is a side view of the locking device with its attachment means in place on the steering column, Fig. 2 is a plan view of the same without the steering rod, Fig. 3 is a part view of underside, with a portion in section, Fig. 4 is a face view of the locking mechanism removed from its casing and with its cover removed and showing the locking member in its locking position, Fig. 5 is a similar view showing the position of the parts when the locking member is in its unlocking or withdrawn position, Fig. 6 is an edge view of the parts as shown in Fig. 4, Figs. 7 and 8 are face and edge views respectively of the control member and Figs. 9 and 10 are side and end views respectively of one of the attachment members.

In the following description the parts of the said figures are referred to by the letters and numerals marked thereon the same letters and numerals indicating like parts in all the said figures.

$a$ is a portion of the fixed steering column and $a'$ a portion of the steering rod within and $b$ is the locking member or bolt which may engage with an aperture in the column $a$ and with a similar aperture in the steering rod (not shown) when brought coincident with the aperture in the steering column. The aperture in the steering rod is so located that when the apertures are coincident the steering wheel or handle occupies the position in which it is usually left when the vehicle is at rest. The bolt $b$ is carried on a sliding plate $b'$ operated by the key in a manner similar to that in ordinary lever latches and is urged forward by the spring $b^2$. $b^3$ are four spring controlled levers similar to those in an ordinary lever latch each lever having a slot $b^4$ the slots becoming coincident when the levers are acted on by the key as usual. When this occurs the projection $b^5$ carried by the plate $b'$ passes into the coincident slots allowing the bolt $b$ to be retired by the key. When the bolt $b$ is forward the said projection $b^6$ abuts against the edges of the levers $b^3$ the levers resting by their projections $b^{13}$ against the projections $b^5$ (see Fig. 4) thus preventing illegitimate pushing back of the bolt $b$ and so constituting a safety device. The aforesaid lock parts are carried on a plate $b^6$ to which a side and bottom plate $b^7$ are secured by screws engaged with the holes $b^8$ and the plate $b^6$ has an aperture $b^{10}$ in which a projection $b^{11}$ on the plate $b'$ engages to guide the latter. The whole lock fits in a casing $c$ to which it is secured by screw $c'$, $c'$ (see Fig. 1) projections $b^9$ in the front part of the plate $b^6$ resting in recesses in the top and bottom plates of the casing $c$. The lock while fitting closely in the casing $c$ along its narrow sides only occupies the middle portion of the casing in plan view (see Fig. 2) leaving vertical spaces or passages between the sides of the casing and larger sides of the lock namely the plates $b^6$, $b^7$.

The casing $c$ is connected to the steering column through the medium of the attachment members $d$, $d$ which together embrace the column. These members $d$, $d$ are connected together through the medium of the member $d'$ having over-hanging parts in which curled longitudinal lips $d^2$, $d^2$ on the members $d$, $d$ are engaged. Relative longitudinal movement of the parts $d$, $d'$ is prevented by the small plate $d^3$ part of which at $d^3$ engages in a hole in the part $d'$ the edges engaging in slots in the rounded adjacent parts of the members $d$, $d$. This engagement is a sufficiently loose one to admit of the members $d$ being turned outwardly from the column $a$ in their engagement with the members $d$ a sufficient distance to pass freely over the column. The members $d$, $d$ have flanges $d^4$, $d^4$ with outward longitudinal lips $d^5$ which may be engaged by a sliding motion of the casing under longitudinal projections $c^2$ $c^2$ on the inner sides thereof. To prevent angular movement of the members $d$, $d$ around the column each is provided with a screw teat $d^6$ which engages with a small depression made in the column $a$. To allow the casing $c$ to be slid over the flanges $d^4$, $d^4$ the bottom of the casing is provided with suitably shaped slots $c^3$, $c^3$ (see Fig. 3) and the spaces between the sides of the plates $b^6$, $b^7$ and the walls of the casing constitute passages to accommodate the said flanges. To lock the casing $c$ in longitudinal position screw bolts $c^4$, $c^4$ are provided which pass through the casing and engage beneath recesses $d^7$, $d^7$ in the flanges $d^4$, $d^4$ (see Fig. 9). The bolts $c^4$ have square heads which lie in square apertures in one side of the casing $c$ and thus bear on parts of the flanges $d^4$ adjacent to the recesses $d^7$, $d^7$ (see Fig. 3). The said bolts therefore also clamp the members $d$, $d$ on the steering column. $e$ is the control member which is of bar or plate like form and slidably works between the casing $c$ and fore part of the plate $b^6$ and the column $a$ its edges working between the inner sides of the flanges $d^4$, $d^4$ (see Fig. 3) and in a recess in the top of the casing $c$. The control member $e$ is guided in its longitudinal or up and down movement by turned out ears $e'$, $e'$ working in slots $b^{12}$ in the fore part of the plate $b^6$ and these means are such also as to limit the longitudinal path of movement of the control member $e$. The said control member has an aperture $e^2$ through which the bolt $b$ may pass when the member has been slid so that that aperture is coincident with the bolt and it also has a recess $e^3$ into which the end of the bolt $b$ engages when the bolt is in unlocking position and the control member has been slid into such a position that the said recess is coincident with the bolt. The bolt may thus be held back in its unlocking position although it is urged forward by its spring and the parts are so arranged that this action is obtained when the control member $e$ is in its lowest position thus insuring that vibration or the like cannot displace the member $e$ from the position in which it is restraining the bolt $b$ in its unlocking position into a position where the bolt may advance into locking position. The control member $e$ has bent over portions $e^4$, $e^4$ at its ends forming ears by which it may be manipulated.

It is to be understood that the locking device should be secured to the fixed steering column so that it projects away from the driver in order that the device should not be in an obstructive position.

The parts are operated as follows:—

Assuming the locking device to be in operation as shown in Figs. 1, 2 and 4, if it be desired to unlock the steering column from the pillar within it, the key is inserted in the lock through the keyholes in the casing $c$ and plate $b^7$ and turned upwardly. This turns the levers $b^3$ upwardly until the slots $b^4$ are coincident with each other and with the projection $b^5$ and the bolt $b$ moves to one side against the action of its spring, the projection $b^5$ passing into the slots $b^4$. The bolt is thus withdrawn from the aperture in the steering pillar and the aperture $e^2$. When this is complete and the key will turn no farther it is held in that position and the control member $e$ pushed down to the limit of its movement. The key is then released and the bolt $b$ is urged forward so that its end engages in the recess $e^3$ and is so held safely in unlocking position. To lock the steering column $a$ and steering pillar together the key is inserted and turned upward to its limit whereupon near the end of its movement it withdraws the bolt $b$ from the recess $e^3$. The key being held in this position the control member is pushed upwardly to its limit and in this position the aperture $e^2$ is opposite the bolt $b$. The key is then released and the bolt $b$ being urged forward by its spring passes through the aperture $e^2$ and those in the fixed steering column and steering pillar. As this action takes place the levers $b^3$ are moved downwardly by their springs until they rest on the projection $b^{13}$ and their slots are below the projection $b^5$ (see Fig. 4) thus automatically securing the bolt in its locking position. To remove the devices from the steering column the bolts $c^4$ are removed after the bolt $b$ is put and held in unlocking position and the casing $c$ and parts carried by it then slid upwardly from off the flanges $d^4$ whereupon the members $d$ may be turned outwardly and removed. To affix the devices to the steering column these operations are reversed but the bolt $b$ must of course be held in unlocking position until the parts are in position.

In some cases where the invention is to be used with motor road vehicles, a device may be provided whereby the magneto or other ignition device is automatically rendered ineffective while the locking member is in locking position. For this purpose an electrical conductor forming part of a suitable circuit is brought to an insulated terminal on the casing $c$ which terminal has a spring contact piece which is so located that it may co-act with a contact on the adjacent one of the ears $e^4$ on the control member $e$, the arrangement being such that when the control member $e$ is in position to allow the locking member to be in locking position the contact on the ear $e^4$ bears against the spring contact piece on the terminal on the case so completing a circuit to render the ignition device ineffective for the time being. Thus the engine cannot be started, while the steering rod is locked and this is brought about automatically when the control member $e$ is being moved into position to allow the locking member to advance, the ignition device becoming effective again when the control member $e$ is moved into its other position.

A locking device in accordance with the present invention most effectively locks the steering wheel or handle and insures that the vehicle cannot be driven or ridden by any unauthorized person thus affording great protection against theft. The locking device may be fitted with a minimum of alteration of the steering column and rod and is compact, light, neat in appearance, unobtrusive and unobstructive, can be very readily fitted and is at the same time comparatively inexpensive to manufacture.

What I claim and desire to secure by Letters Patent of the United States is:—

1. A locking device for the purpose set forth, comprising a locking member, a spring urging said member into locking position, lock mechanism for controlling said locking member by use of a key, a movable control member restraining in one position said locking member and in another position allowing the said locking member to operate, and a key controlled engagement device for said control member in its restraining position.

2. A locking device for the purpose set forth, comprising a locking member, a spring urging said member into locking position, lock mechanism for controlling said locking member by use of a key, and a movable control member restraining in one position said locking member and in another position allowing the said locking member to operate, the said control member having a recess to accommodate the end of the locking member when restrained and to lock the control member in that position.

3. A locking device for the purpose set forth comprising a locking member, a spring to actuate the locking member into locking position, means by which the said member may be withdrawn from locking position against the action of the said spring by use of a key, means to secure the device on the fixed steering column, and a control member slidably located between the means for operating the said locking member and the steering column the said control member having an aperture through which the said locking member may operate when the control member is in one position and a recess in which the end of the locking member may engage to retain it in unlocking position when the said control member is placed in another position.

4. A locking device for the purpose set forth comprising a locking member, a spring urging said member into locking position, a lock mechanism for controlling said locking member by use of a key, and a slidable control member restraining in one position said locking member and in another position allowing said locking member to operate, the said control member being located between the lock mechanism and the steering column and operable upwardly and downwardly, and in its lower position when restraining the locking member.

5. A locking device for the purpose set forth comprising a locking member, a spring urging said member into locking position, lock mechanism for controlling the said locking member by use of a key, a casing over the lock mechanism, and a slidable control member restraining in one position said locking member and in another position allowing the said locking member to operate, the said control member extending above and below the said casing and provided at each end with projections by which it may be manipulated.

6. A locking device for the purpose set forth comprising a locking member, a spring urging said member into locking position, lock mechanism for controlling said locking member by use of a key, a slidable control member restraining in one position the said locking member and in another position allowing the said locking member to operate, the said control member being located between the lock mechanism and the steering column and of bar or plate form, and projections on said control member working in slots.

7. Attachment means for a locking device for the purpose set forth comprising two members together adapted to embrace the steering column, a connection between the said members operative to permit them to be opened out to pass over the steering column, flanges on said members with which and from which flanges the lock device may be engaged and disengaged by a sliding motion when and while the attachment means are disposed on the steering column, to connect or disconnect the lock device to the attachment means and at the same time hold the said members in embracing position.

8. An attachment means for a locking device for the purpose set forth, comprising two members together adapted to embrace the steering column, a connection between the said members operative to permit them to be opened out to pass over the steering column, flanges on the said members to engage the locking device by a sliding motion to connect the said lock device to the attachment members and at the same time hold the said members in embracing position, lips along the edges of the said flanges, projections in the case of the lock device to engage behind said lips, and securing members to pass through the said case and act on the said flanges to hold the flanged members in their position on the steering column and at the same time secure the lock device to the said members and prevent sliding movement of the lock device on the said flanges.

WILLIAM JOHN NIXON MANN.